(12) United States Patent
Park et al.

(10) Patent No.: US 12,493,441 B2
(45) Date of Patent: *Dec. 9, 2025

(54) TILING DISPLAY APPARATUS

(71) Applicant: LG Display Co., Ltd., Seoul (KR)

(72) Inventors: Sang Woo Park, Paju-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,218

(22) Filed: Apr. 5, 2024

(65) Prior Publication Data

US 2024/0248668 A1 Jul. 25, 2024

Related U.S. Application Data

(63) Continuation of application No. 17/979,607, filed on Nov. 2, 2022, now Pat. No. 11,977,807.

(30) Foreign Application Priority Data

Dec. 31, 2021 (KR) .................. 10-2021-0194684
Jun. 2, 2022 (KR) .................. 10-2022-0067758

(51) Int. Cl.
*G06F 3/14* (2006.01)
*G06F 11/16* (2006.01)
*G09G 3/00* (2006.01)

(52) U.S. Cl.
CPC .......... *G06F 3/1446* (2013.01); *G06F 11/162* (2013.01); *G09G 3/006* (2013.01); *G06F 2201/86* (2013.01); *G09G 2300/026* (2013.01); *G09G 2330/10* (2013.01); *G09G 2330/12* (2013.01); *G09G 2360/04* (2013.01)

(58) Field of Classification Search
CPC .. G06F 3/1446; G06F 11/162; G06F 2201/86; G09G 3/006; G09G 2300/026; G09G 2330/10; G09G 2330/12; G09G 2360/04
See application file for complete search history.

(56) References Cited

U.S. PATENT DOCUMENTS 11,727,862 B2 * 8/2023 Seo .................. G09G 3/32
345/204
11,977,807 B2 * 5/2024 Park ................. G06F 11/162
(Continued)

OTHER PUBLICATIONS

United States Office Action, U.S. Appl. No. 17/979,607, Sep. 28, 2023, 14 pages.

*Primary Examiner* — Ke Xiao
*Assistant Examiner* — Jennifer L Zubajlo
(74) *Attorney, Agent, or Firm* — Fenwick & West LLP

(57) ABSTRACT

A tiling display apparatus includes a plurality of display modules connected to one another through a first interface circuit and a second interface circuit and a set board receiving a defect occurrence and position signal, generated in a broken-down module of the plurality of display modules, from the broken module through the first interface circuit in a first period, generating a defect recognition completion signal in a second period succeeding the first period, and transferring the defect recognition completion signal to the broken-down module through the second interface circuit in the second period.

11 Claims, 14 Drawing Sheets

(56) References Cited

U.S. PATENT DOCUMENTS

| | | | | |
|---|---|---|---|---|
| 2014/0084941 | A1* | 3/2014 | Yun | G09G 3/3233 |
| | | | | 324/543 |
| 2018/0080666 | A1 | 3/2018 | Gotou et al. | |
| 2018/0165051 | A1* | 6/2018 | Kim | G09G 5/006 |
| 2019/0080666 | A1* | 3/2019 | Chappalli | G09G 3/22 |
| 2019/0103048 | A1* | 4/2019 | Kwon | G09G 5/18 |
| 2020/0251063 | A1* | 8/2020 | Liu | G09G 3/36 |
| 2021/0011820 | A1* | 1/2021 | Kim | G06F 3/1446 |
| 2021/0233464 | A1* | 7/2021 | Yeo | G06F 3/1446 |
| 2021/0248939 | A1* | 8/2021 | Ahn | G09G 3/2092 |
| 2023/0215344 | A1 | 7/2023 | Kim et al. | |
| 2023/0215345 | A1 | 7/2023 | Kim et al. | |
| 2023/0215398 | A1 | 7/2023 | Lee et al. | |
| 2023/0221912 | A1* | 7/2023 | Ahn | G09G 3/2096 |
| 2023/0236785 | A1 | 7/2023 | Joo et al. | |
| 2024/0221553 | A1* | 7/2024 | Hong | G09G 3/006 |

\* cited by examiner

| Breakdown Diagnosis List | | |
|---|---|---|
| Number | Error name | Flag |
| 1 | GIA Monitoring | |
| 2 | Short/Open | 0→1 |
| 3 | Panel Crack | |
| 4 | EVDD Protection | |
| 5 | T-Con Output Defect | |
| ⋮ | ⋮ | |
| N | - | |

FIG. 15

| Breakdown Diagnosis List | | | |
|---|---|---|---|
| Number | Error name | Flag | Recovery |
| 1 | GIA Monitoring | 0→1 | |
| 2 | Short/Open | | |
| 3 | Panel Crack | | |
| 4 | EVDD Protection | | |
| 5 | T-Con Output Defect | | |
| ⋮ | ⋮ | | |
| N | - | | |

TILING DISPLAY APPARATUS

CROSS-REFERENCE TO RELATED APPLICATIONS

This application is a continuation of U.S. patent application Ser. No. 17/979,607 filed on Nov. 2, 2022, which claims the benefit of the Korean Patent Applications No. 10-2021-0194684 filed on Dec. 31, 2021 and No. 10-2022-0067758 filed on Jun. 2, 2022, each of which is hereby incorporated by reference in its entirety.

FIELD OF THE DISCLOSURE

The present disclosure relates to a tiling display apparatus capable of expanding.

Discussion of the Related Art

Large-sized displays may be used in various fields such as indoor and outdoor digital advertisements. In order to satisfy the demands for large-sized displays, tiling display apparatuses capable of being expanded have been proposed. In tiling display apparatuses, a single screen is configured by connecting a plurality of display modules, and a desired screen size may be implemented by adjusting the number of display modules connected to one another.

SUMMARY

Because such tiling display apparatuses are mainly installed outdoors due to the characteristic of commercial products, it is difficult to recognize the occurrence or not of an error with eyes of a user. Also, because the tiling display apparatuses include a number of parts for configuring a large-sized screen, much time may be taken in detecting a cause of an error when the error occurs.

To overcome the aforementioned problem of the related art, the present disclosure may provide a tiling display apparatus which may automatically check a defect position of a broken-down display module and may additionally and automatically check a defect history of a broken-down display module.

To achieve these objects and other advantages and in accordance with the purpose of the disclosure, as embodied and broadly described herein, a tiling display apparatus includes a plurality of display modules connected to one another through a first interface circuit and a second interface circuit and a set board receiving a defect occurrence and position signal, generated in a broken-down module of the plurality of display modules, from the broken module through the first interface circuit in a first period, generating a defect recognition completion signal in a second period succeeding the first period, and transferring the defect recognition completion signal to the broken-down module through the second interface circuit in the second period.

In addition, a tiling display apparatus may comprise a set board, and a plurality of display modules connected to one another through a first interface circuit and a second interface circuit. Each of the plurality of display modules may comprise a timing controller configured to: generate, when generated when the display module is broken-down, a defect occurrence and position signal, and transfer the defect occurrence and position signal towards the set board through the first interface circuit in a first period, and receive a defect recognition completion signal, which is generated by the set board, through the second interface circuit in a second period succeeding the first period.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 15 is a diagram illustrating an example of a breakdown diagnosis list corresponding to the defect history signal of FIG. 14.

DETAILED DESCRIPTION OF THE DISCLOSURE

Figure 1:
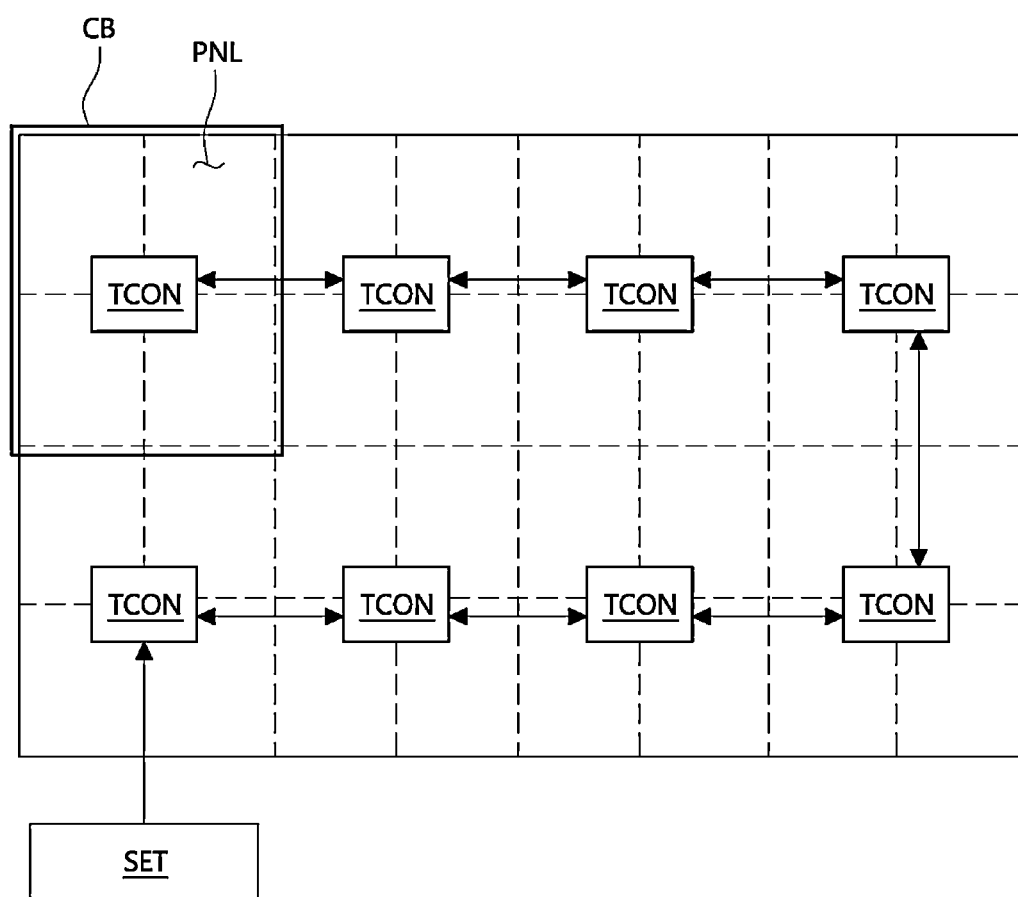
FIG. 1 is a diagram schematically illustrating a tiling display apparatus according to an embodiment of the present disclosure.

Hereinafter, the present disclosure will be described more fully with reference to the accompanying drawings, in which embodiments of the disclosure are shown. The disclosure may however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
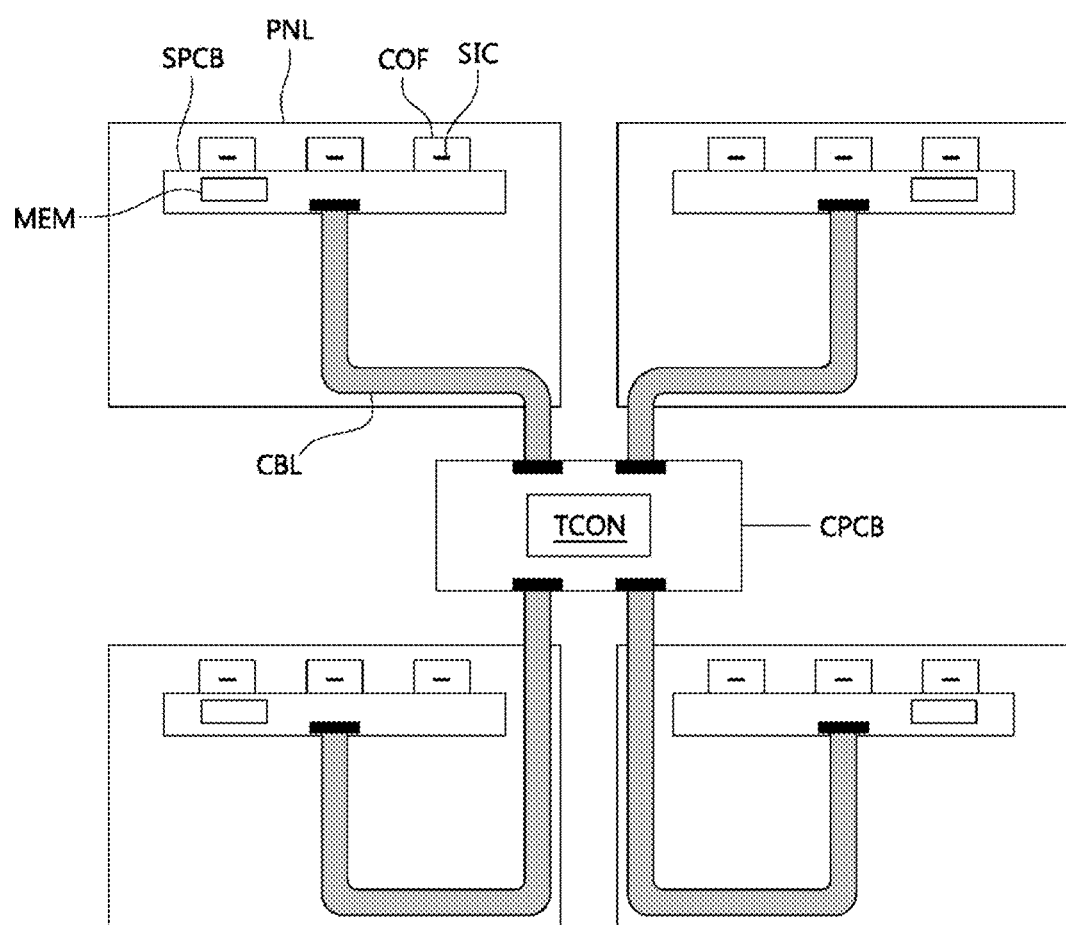
FIG. 2 is a diagram illustrating a connection configuration of a display module.

FIG. 1 is a diagram schematically illustrating a tiling display apparatus 100 according to an embodiment of the present disclosure. FIG. 2 is a diagram illustrating a connection configuration of a display module.

Referring to FIGS. 1 and 2, the tiling display apparatus 100 according to an embodiment of the present disclosure may include a set board SET and a plurality of display modules CB. Each of the display modules CB may be referred to as a cabinet.

The display modules CB may be connected to one another through a serial interface circuit to configure a large screen. A total resolution of the large screen may be determined as a total sum of unit resolutions of each display module CB. For example, in a case where a screen is configured by eight display modules CB having a unit resolution of 960*1080, a total resolution of the screen may be 3840*2160.

Each display module CB may be implemented as an electroluminescent display type or a liquid crystal display type, and in the following embodiments, an embodiment where a display module CB is implemented as a micro light emitting diode (LED)-based electroluminescent display type is taken as an example. However, the inventive concept is not limited to an implementation type of a display module CB.

The set board SET may automatically check a defect position of a broken-down display module (hereinafter referred to as a broken-down module) and may additionally and automatically check a defect history of a broken-down module, and to this end, the set board SET and the display modules CB may be connected to each other through an interface circuit, which can be implemented as, for example, a serial peripheral interface (SPI) but not limited thereto.

The interface circuit may be implemented as a bidirectional multi-chain interface of a feedback loop type. The interface circuit may enable individual bidirectional serial communication between the display modules CB and between the set board SET and the display module CB, thereby securing a short communication line and enhancing the speed and reliability of large-capacity data communication through the short communication line.

Each display module CB may include a plurality of display panels PNL, a plurality of panel driving circuits for driving the display panels PNL, and a timing controller TCON which controls an operation timing of each of the panel driving circuits.

The timing controller TCON may be mounted on a control printed circuit board (PCB) CPCB and may be connected to the panel driving circuits in parallel through a branch cable CBL. The timing controller TCON may be further connected to an adjacent display module CB or the set board SET through the interface circuit.

The panel driving circuits may be independently connected to each of the plurality of display panels PNL. The panel driving circuits may include a source PCB SPCB connected to the timing controller TCON through the branch cable CBL, a memory circuit MEM mounted on the source PCB SPCB, a conductive film COF electrically connecting the source PCB SPCB to the display panel PNL, a data driver SIC bonded on the conductive film COF, and a gate driver and a power circuit electrically connected to the source PCB SPCB.

The memory circuit MEM may be a non-volatile memory which stores a panel characteristic and may include a correction value for gamma setting, a first compensation value for compensating for a driving characteristic deviation/color deviation between pixels, a second compensation value for compensating for a boundary deviation between adjacent display panels PNLs, various image qualities, and driving control data. The memory circuit MEM may be flash memory and/or electrically erasable programmable read-only memory (EEPROM). A high amount of data may be stored in flash memory, and a low amount of data may be stored in EEPROM.

Figure 3:
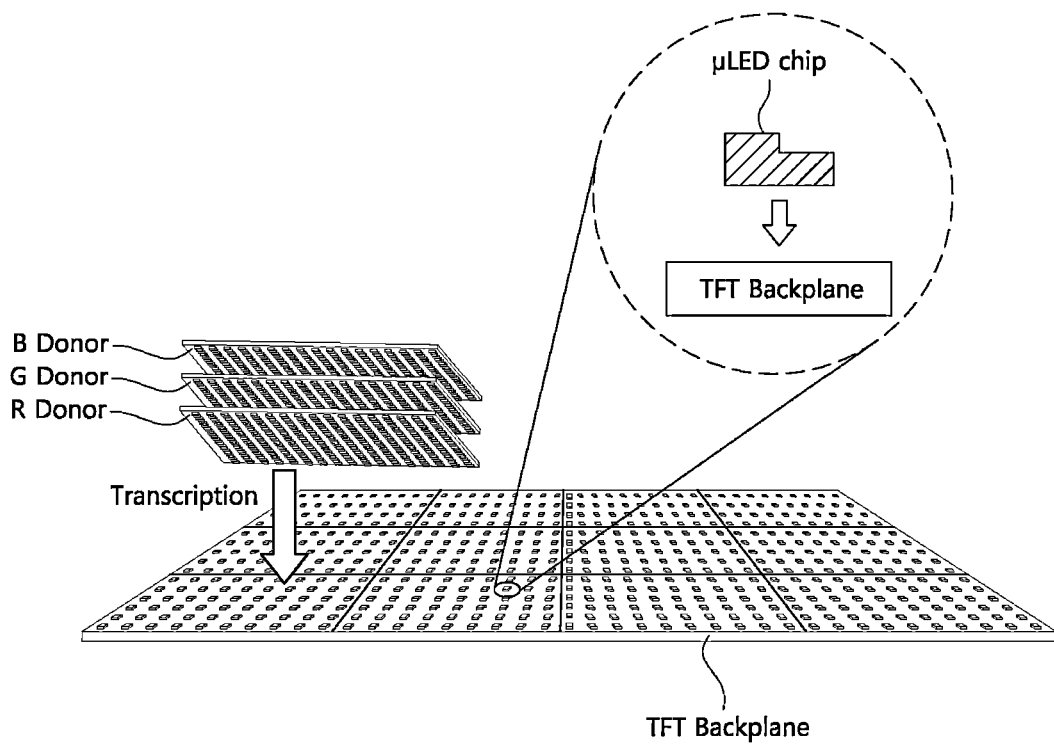
FIGS. 3 and 4 are diagrams illustrating a display panel based on a micro light emitting diode (LED)
Figure 4:
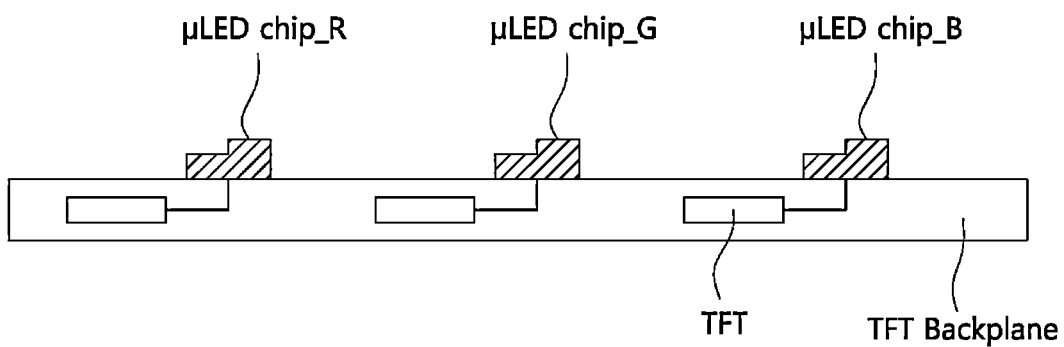
Figure 5:
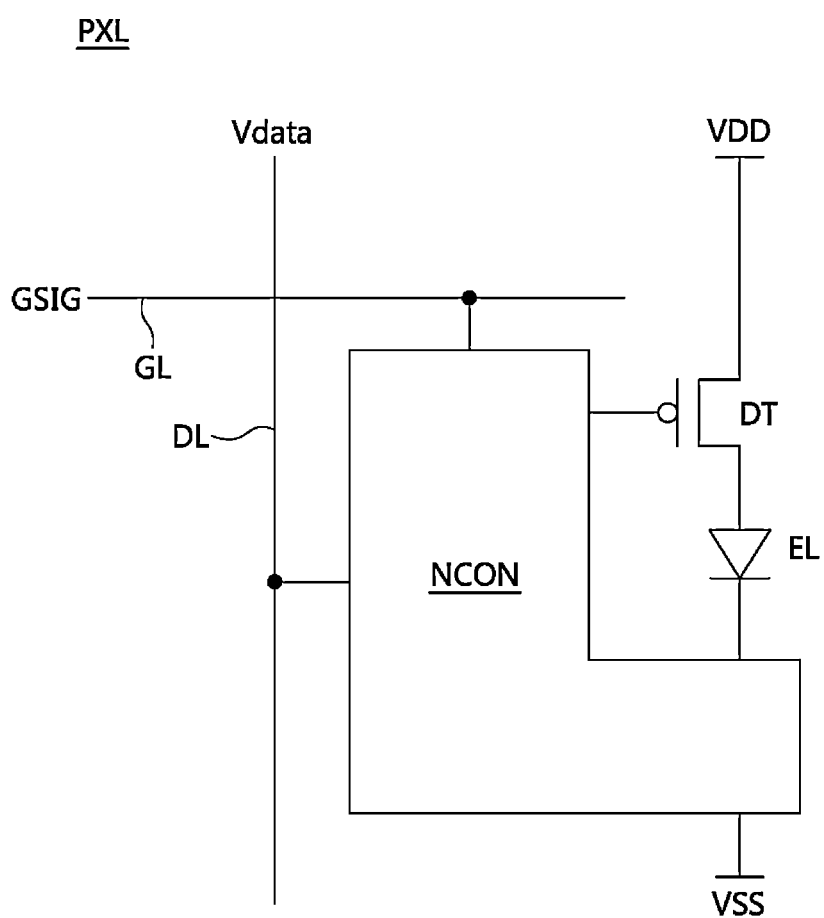
FIG. 5 is a schematic equivalent circuit diagram of a pixel included in a display panel.

FIGS. 3 and 4 are diagrams illustrating a display panel based on a micro LED. FIG. 5 is a schematic equivalent circuit diagram of a pixel included in a display panel.

Referring to FIGS. 3 and 4, a pixel array for reproducing an input image may be provided in each of display panels PNL. A plurality of pixels may be arranged in the pixel array, and signal lines for driving the pixels may be arranged in the pixel array. The signal lines may include a plurality of data lines DL for supplying data voltages Vdata to the pixels (see FIG. 5), a plurality of gate lines GL for supplying a gate signal GSIG to the pixels (see FIG. 5), and a plurality of power lines for supplying a source voltage to the pixels.

Each of the pixels may include a micro-LED chip (μLED chip) as a light emitting device EL. A plurality of micro-LED chips (μLED chip) may include red chips (μLED chip_R), green chips (µLED chip_G), and blue chips (µLED chip_B), which are disposed on a thin film transistor (TFT) backplane. A red (R) pixel may include a red chip (µLED chip_R) as a light emitting device EL, a green (G) pixel may include a green chip (µLED chip_G) as a light emitting device EL, and a blue (B) pixel may include a blue chip (µLED chip_B) as a light emitting device EL.

The micro-LED chips (µLED chip) may be transferred from R/G/B donors, and thus, may be mounted on a TFT backplane. The red chips (µLED chip_R) may be transferred from an R donor, the green chips (µLED chip_G) may be transferred from a G donor, and the blue chips (µLED chip_B) may be transferred from a B donor. Transfer technology may use an electrostatic force, a laser, a speed-dependent tacky force, and a load-dependent tacky force. The transfer technology is not limited thereto and may use self-assembly based on an electrostatic force.

The TFT backplane may be implemented in an active matrix structure for efficient driving. In the TFT backplane, the pixels may be defined by the data lines DL, the gate lines GL, and the power lines.

A plurality of pixels may configure one unit pixel. For example, R, G, and B pixels arranged adjacent to one another may configure one unit pixel in an extension direction of the gate line GL or an extension direction of the data line DL.

As in FIG. 5, a pixel PXL may include a light emitting device EL, a driving TFT DT, and a node circuit NCON.

The node circuit NCON may be connected to the gate line GL and the data line DL. The node circuit NCON may be supplied with the data voltage Vdata through the data line DL and may be supplied with the gate signal GSIG through the gate line GL. The node circuit NCON may apply the data voltage Vdata to a gate electrode of the driving TFT DT in synchronization with the gate signal GSIG, and thus, may set a gate-source voltage of the driving TFT DT on the basis of a condition for generating a driving current. The node circuit NCON may include an internal compensation circuit which senses and compensates for a threshold voltage and/or electron mobility of the driving TFT DT.

The driving TFT DT may be a driving element which generates the driving current on the basis of the gate-source voltage thereof. The gate electrode of the driving TFT DT may be connected to the node circuit NCON, a first electrode (a drain electrode) thereof may be connected to a high level pixel power VDD, and a second electrode (a source electrode) thereof may be connected to a light emitting device EL.

The light emitting device EL may be a light emitting device which emits light having strength corresponding to the driving current input to the driving TFT DT. The light emitting device EL may be implemented with a micro-LED including an inorganic light emitting layer. A first electrode of the light emitting device EL may be connected to the driving TFT DT, and a second electrode thereof may be connected to a low level pixel power VSS.

A connection configuration and an operation of one pixel PXL may be merely an embodiment, and the spirit of the present disclosure is not limited thereto. For example, each of the driving TFT DT and the node circuit NCON may be implemented based on a PMOS transistor, an NMOS transistor, or a CMOS transistor. Also, the gate line GL connected to the node circuit NCON may be provided in plurality. Also, the light emitting device EL according to the present disclosure may be implemented with a common cathode circuit, but is not limited thereto and may be implemented with a common anode circuit.

Figure 6:
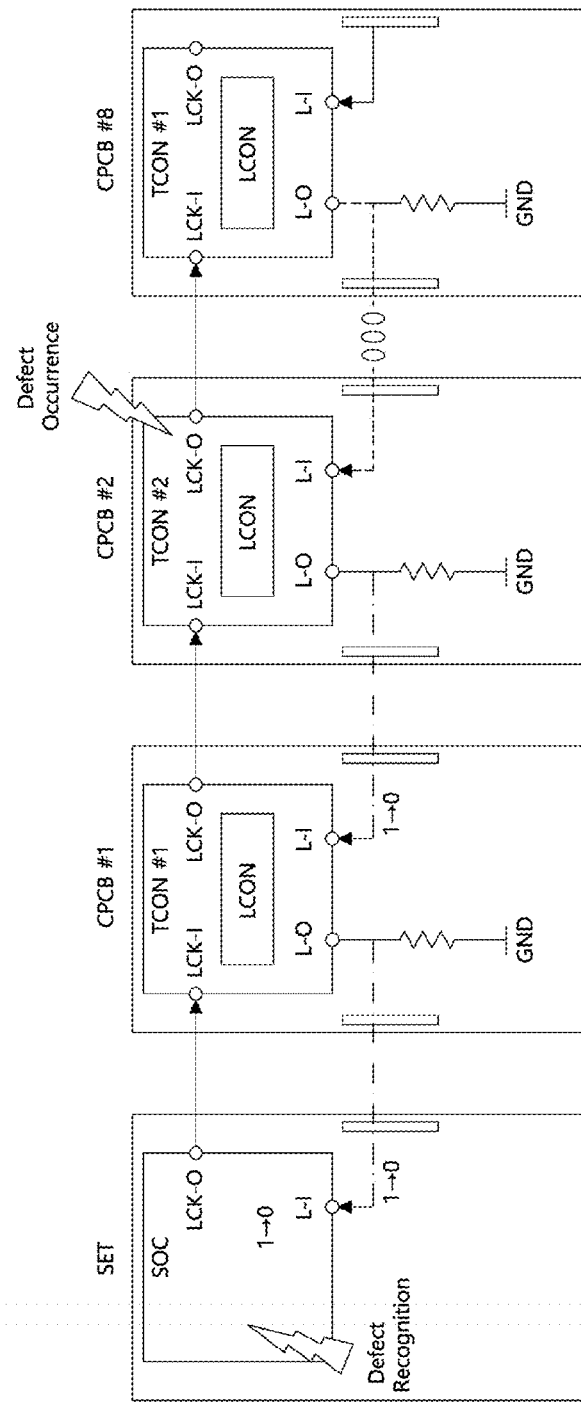
FIG. 6 is a diagram illustrating a breakdown diagnosis structure of a tiling display apparatus according to the present embodiment.
Figure 7:
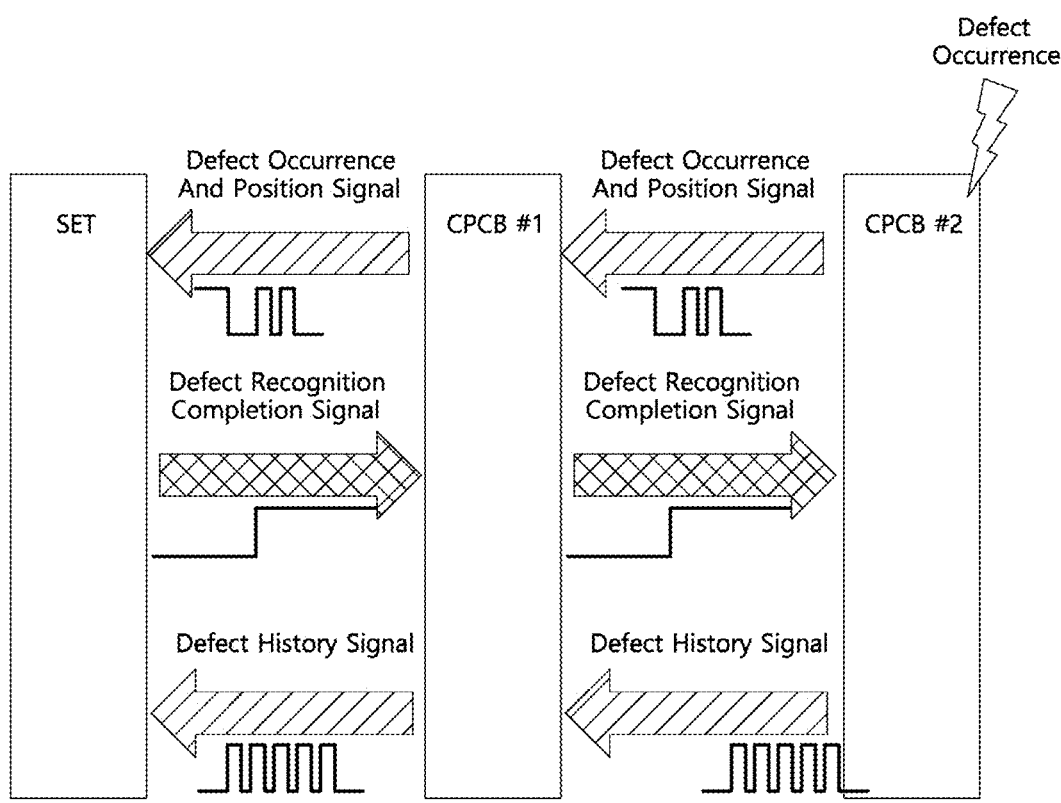
FIG. 7 is a diagram schematically illustrating a breakdown diagnosis sequence of a tiling display apparatus according to the present embodiment.

FIG. 6 is a diagram illustrating a breakdown diagnosis structure of a tiling display apparatus according to the present embodiment. FIG. 7 is a diagram schematically illustrating a breakdown diagnosis sequence of a tiling display apparatus according to the present embodiment.

Referring to FIG. 6, the tiling display apparatus according to the present embodiment may use a first interface circuit and a second interface circuit based on an SPI scheme, for automatic breakdown diagnosis. The first interface circuit may transfer a defect occurrence and position signal and a defect history signal of a broken-down module (for example, a broken-down module in which a control PCB CPCB #2 is located, and which may be referred to as a broken-down module CPCB #2 hereinafter) from a broken-down module to a set board SET. The second interface circuit may transfer a defect recognition completion signal of the set board SET from the set board SET to the broken-down module. A signal transfer direction of the first interface circuit may be opposite to a signal transfer direction of the second interface circuit.

A breakdown diagnosis sequence may be performed in a power-on sequence period along with an "Auto nID setting process". The power-on sequence period may be a time until a screen is displayed from after an operation power is turned on, in the tiling display apparatus. The "Auto nID setting process" may denote an operation which sequentially generates a module identification number corresponding to a connection sequence on the basis of control by the set board SET and feeds back a control response signal including a result thereof to the set board SET through a third interface circuit. Each display module may check a connection sequence thereof through the "Auto nID setting process".

The set board SET may include a system on chip circuit SOC for breakdown diagnosis. The system on chip circuit SOC may include a first terminal (input terminal) L-I connected to the first interface circuit and a second terminal (output terminal) LCK-O connected to the second interface circuit.

Each display module may include one of control PCBs CPCB #1 to CPCB #8 having different connection sequences and one of timing controllers TCON #1 to TCON #8 corresponding thereto. The timing controller may include a diagnosis control circuit LCON for generating or transferring a defect occurrence and position signal and an optional defect history signal, a first input terminal L-I and a first output terminal L-O connected to the first interface circuit, and a second input terminal LCK-I and a second output terminal LCK-O connected to the second interface circuit.

Referring to FIG. 7, the set board SET may receive a defect occurrence and position signal of a broken-down module (for example, a broken-down module CPCB #2) from the broken-down module through the first interface circuit in a first period. Also, the set board SET may generate a defect recognition completion signal in a second period succeeding the first period and may transfer the defect recognition completion signal to the broken-down module through the second interface circuit. Also, optionally, the set board SET may further receive a defect history signal of the broken-down module through the first interface circuit in a third period succeeding the second period.

Each of the defect occurrence and position signal, the defect recognition completion signal, and the defect history signal may be a pulse signal which swings between a high logic voltage and a low logic voltage.

Figure 8:
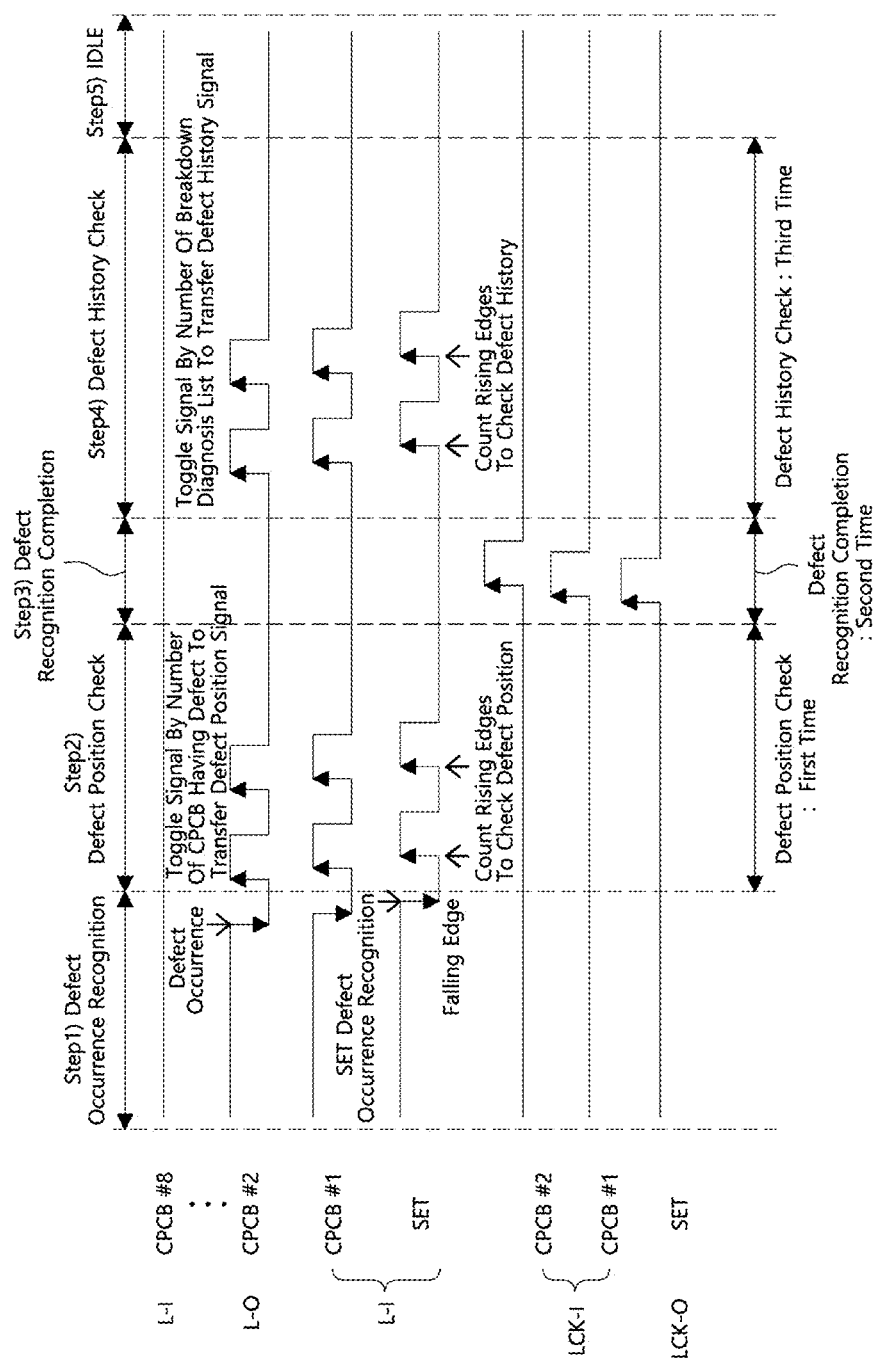
FIGS. 8 and 9 are diagrams illustrating in detail a breakdown diagnosis sequence of a tiling display apparatus according to the present embodiment.
Figure 9:
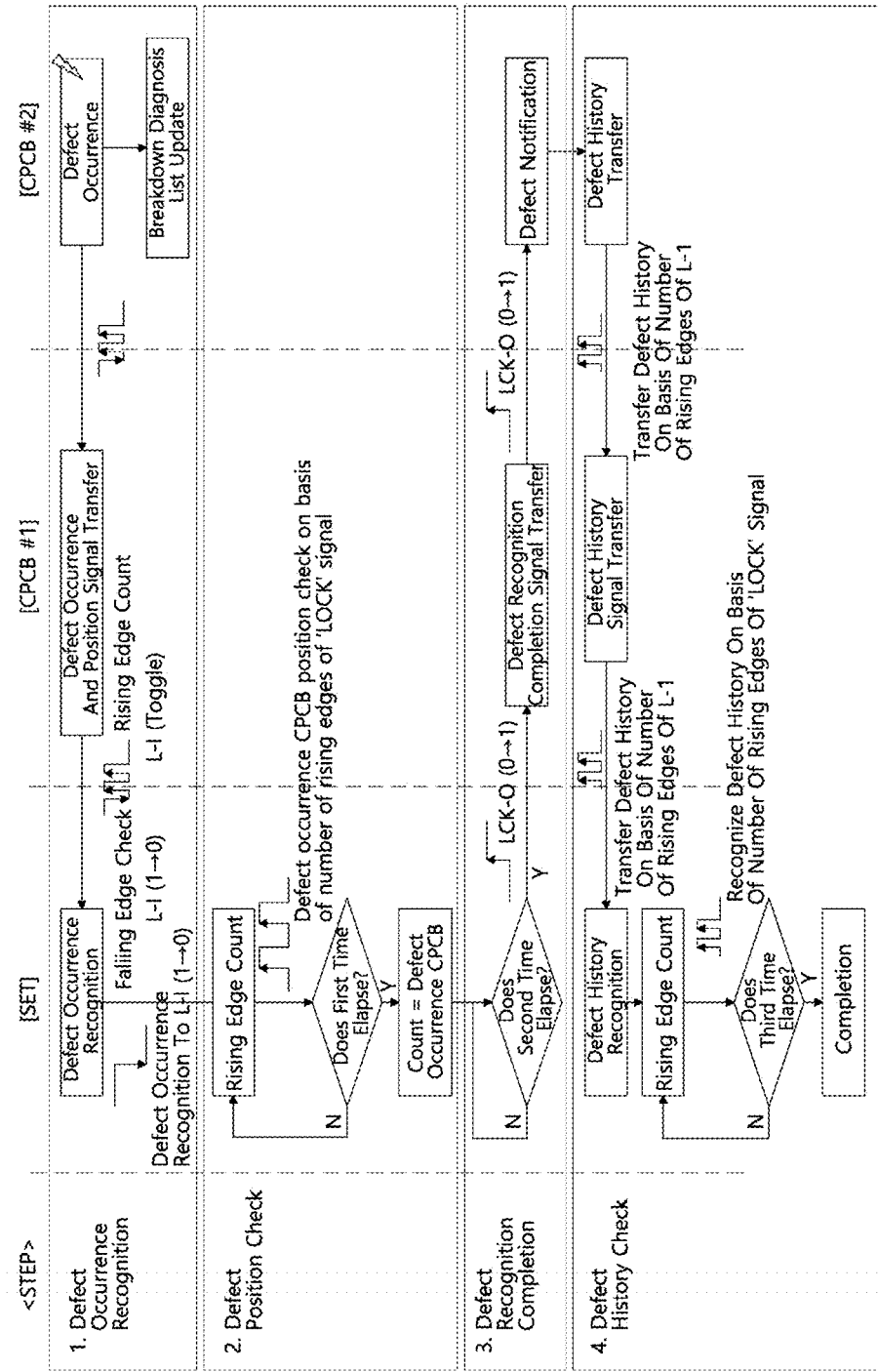
Figures 10, 11:
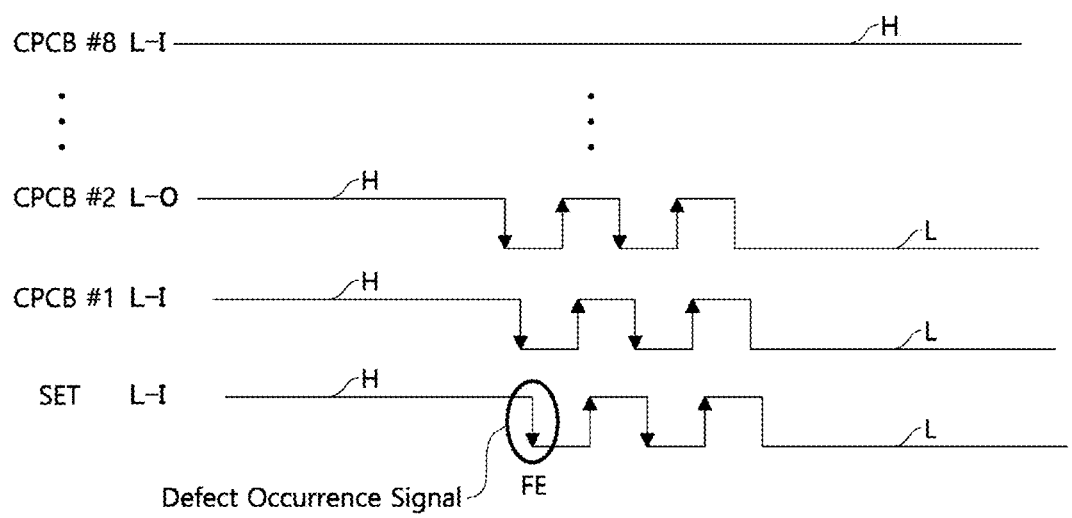
FIG. 10 is a diagram illustrating an example of a breakdown diagnosis list corresponding to a defect history signal of FIGS. 8 and 9.
FIG. 11 is a diagram illustrating the principle of recognizing the occurrence of a defect of a broken-down module in a set board.

FIGS. 8 and 9 are diagrams illustrating in detail a breakdown diagnosis sequence of a tiling display apparatus according to the present embodiment. FIG. 10 is a diagram illustrating an example of a breakdown diagnosis list corresponding to a defect history signal of FIGS. 8 and 9. In FIGS. 8 to 10, an example where a broken-down module includes a control PCB CPCB #2 having a connection sequence '2' is illustrated.

Referring to FIGS. 8 to 10, a broken-down module may periodically sense a monitoring signal input through an internal bus line to check the occurrence or not of a defect, and when a defect occurs, the broken-down module may update a defect history in a predetermined breakdown diagnosis list and may generate a defect occurrence and position signal.

The broken-down module may generate the defect occurrence and position signal as a pulse signal. The broken-down module may shift the defect occurrence and position signal from a high logic voltage to a low logic voltage and may further toggle a voltage of the defect occurrence and position signal by a connection sequence '2' thereof, that is, accordingly toggle a voltage of the defect occurrence and position signal twice. Accordingly, the defect occurrence and position signal may include a first falling edge and two first rising edges arranged next to the first falling edge.

The defect occurrence and position signal of the broken-down module may be transferred to the first terminal L-I of the set board SET through the first interface circuit. In the first period, the set board SET may recognize the occurrence of a defect of the broken-down module on the basis of the first falling edge of the defect occurrence and position signal, count the first rising edges of the defect occurrence and position signal, and recognize a position of the broken-down module on the basis of the number of first rising edges.

The set board SET may generate a defect recognition completion signal for notifying that a position of the broken-down module is recognized, in the second period succeeding the first period. The defect recognition completion signal may be a pulse signal and may include one second rising edge.

The defect recognition completion signal of the set board SET may be transferred to the second input terminal LCK-I of the broken-down module through the second interface circuit. The broken-down module may check a defect recognition completion state of the set board SET on the basis of a second rising edge of the defect recognition completion signal, in the second period.

The broken-down module may generate a defect history signal as a pulse signal, in a third period succeeding the second period. The broken-down module may toggle a voltage of the defect history signal by a number corresponding to a defect history setting sequence of a breakdown diagnosis list. For example, when a defect history is "short/open", a defect history setting sequence in the breakdown diagnosis list of FIG. 10 may be "2", and the broken-down module may accordingly toggle a voltage of the defect history signal twice. In this case, the defect history signal may include two third rising edges.

The defect history signal of the broken-down module may be transferred to the first terminal L-I of the set board SET through the first interface circuit. In the third period, the set board SET may count third rising edges of the defect history signal and may recognize a defect history of the broken-down module on the basis of the number of third rising edges. Because the number of third rising edges is two, the set board SET may recognize, as a defect history of the broken-down module, "short/open" corresponding to a defect history setting sequence "2" (which setting sequence corresponds to, for example, being the same as, the number of third rising edges) in the breakdown diagnosis list.

FIG. 11 is a diagram illustrating the principle of recognizing the occurrence of a defect of a broken-down module in a set board.

Referring to FIG. 11, a defect occurrence and position signal may be shifted from a high logic voltage H to a low logic voltage L in a broken-down module CPCB #2. The defect occurrence and position signal may be transferred to a first terminal L-I of a set board SET through a first interface circuit passing through a display module CPCB #1 between the set board SET and the broken-down module CPCB #2. The set board SET may recognize the occurrence of a defect of the broken-down module CPCB #2 on the basis of a first falling edge FE of the defect occurrence and position signal.

Figure 12:
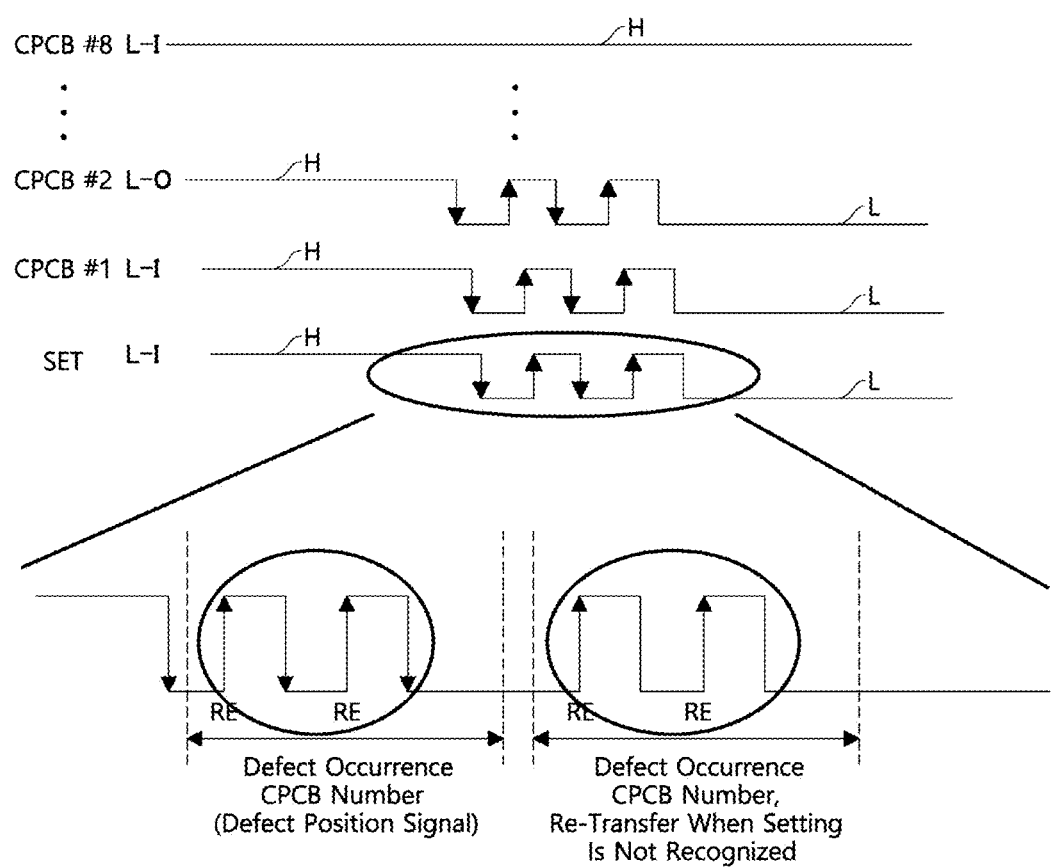
FIG. 12 is a diagram illustrating the principle of recognizing a defect occurrence position of a broken-down module in a set board.

FIG. 12 is a diagram illustrating the principle of recognizing a defect occurrence position of a broken-down module in a set board.

Referring to FIG. 12, a defect occurrence and position signal may be shifted from a high logic voltage H to a low logic voltage L in a broken-down module CPCB #2, and then, a voltage of the defect occurrence and position signal may be further toggled by a connection sequence '2' of the broken-down module CPCB #2. The defect occurrence and position signal may be transferred to a first terminal L-I of a set board SET through a first interface circuit passing through a display module CPCB #1 between the set board SET and the broken-down module CPCB #2. The set board SET may recognize the occurrence of a defect of the broken-down module on the basis of a first falling edge of the defect occurrence and position signal, and then, may count first rising edges RE of the defect occurrence and position signal to recognize, as the broken-down module CPCB #2, a display module having a connection sequence '2' (which connection sequence corresponds to, for example, being the same as, the number of first rising edges).

When a defect recognition completion signal is not received from the set board SET within a predetermined time, the broken-down module CPCB #2 may re-transfer a defect occurrence and position signal to the first terminal L-I of the set board SET through the first interface circuit.

Figure 13:
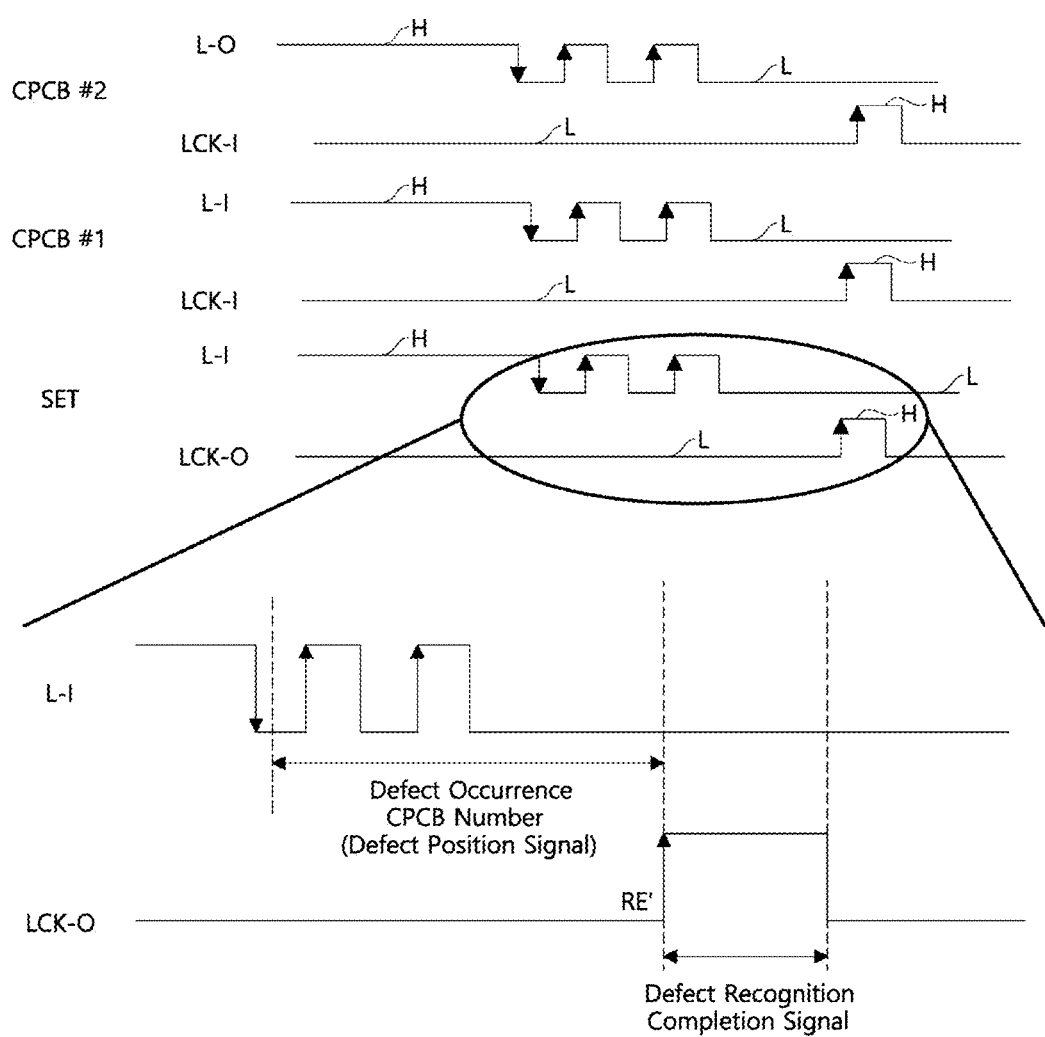
FIG. 13 is a diagram illustrating an example of detecting a defect occurrence position of a broken-down module in a set board and transferring a defect recognition completion signal to the broken-down module.

FIG. 13 is a diagram illustrating an example of transferring a defect recognition completion signal from a set board to a broken-down module.

Referring to FIG. 13, a set board SET may check a defect occurrence position of a broken-down module CPCB #2 and may generate a defect recognition completion signal. The set board SET may transfer the defect recognition completion signal to a second input terminal LCK-I of the broken-down module CPCB #2 through a second interface circuit. The broken-down module CPCB #2 may check a defect recognition completion state of the set board SET on the basis of a second rising edge RE' of the defect recognition completion signal.

Figure 14:
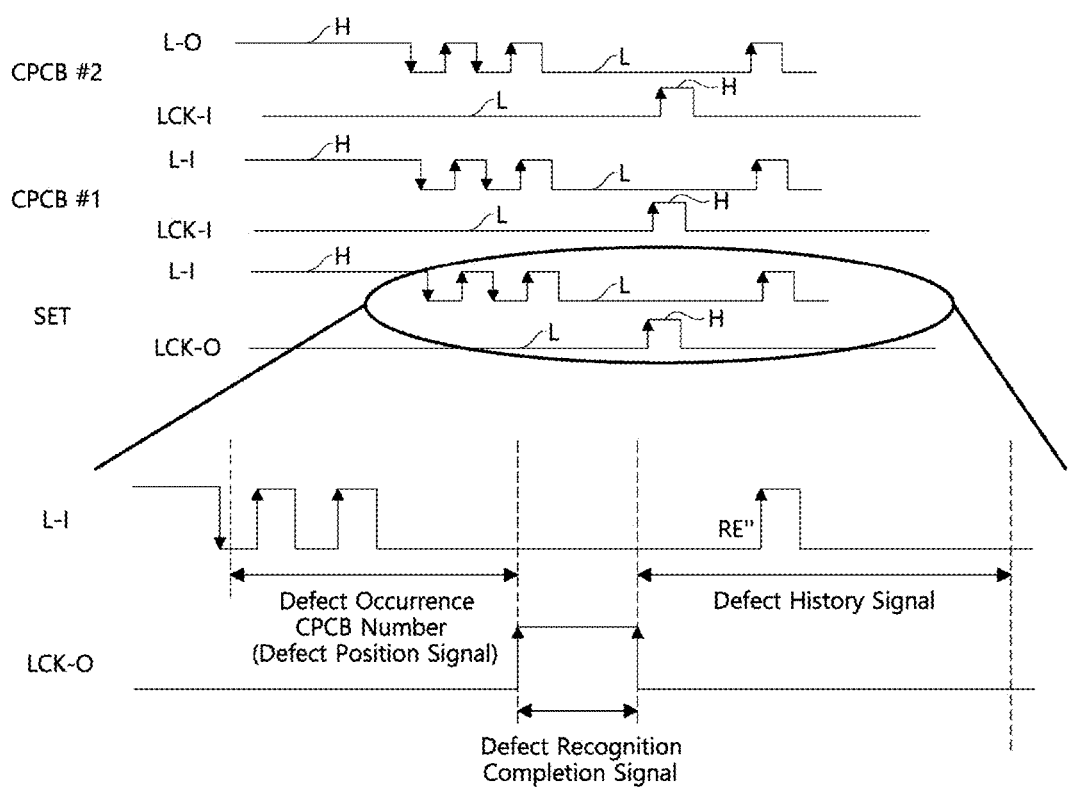
FIG. 14 is a diagram illustrating an example of receiving a defect recognition completion signal from a set board and transferring a defect history signal to the set board.

FIG. 14 is a diagram illustrating an example of receiving a defect recognition completion signal from a set board and transferring a defect history signal to the set board. FIG. 15 is a diagram illustrating an example of a breakdown diagnosis list corresponding to the defect history signal of FIG. 14.

Referring to FIG. 14, a broken-down module CPCB #2 may receive a defect recognition completion signal from a set board SET and may generate a defect history signal as a pulse signal. The broken-down module CPCB #2 may toggle a voltage of the defect history signal by a number corresponding to a defect history setting sequence of a breakdown diagnosis list. For example, when a defect history is "GIA Monitoring", a defect history setting sequence in the breakdown diagnosis list of FIG. 15 may be "1", and the broken-down module CPCB #2 may accordingly toggle a voltage of the defect history signal once. In this case, the defect history signal may include one third rising edge RE".

The defect history signal of the broken-down module CPCB #2 may be transferred to the first terminal L-I of the set board SET through the first interface circuit. The set board SET may count third rising edges of the defect history signal and may recognize a defect history of the broken-down module CPCB #2 on the basis of the number of third rising edges. The set board SET may previously know the breakdown diagnosis list. Because the number of third rising edges is one, the set board SET may recognize, as a defect history of the broken-down module CPCB #2, "GIA Monitoring" corresponding to a defect history setting sequence "1" in the breakdown diagnosis list.

Figure 16:
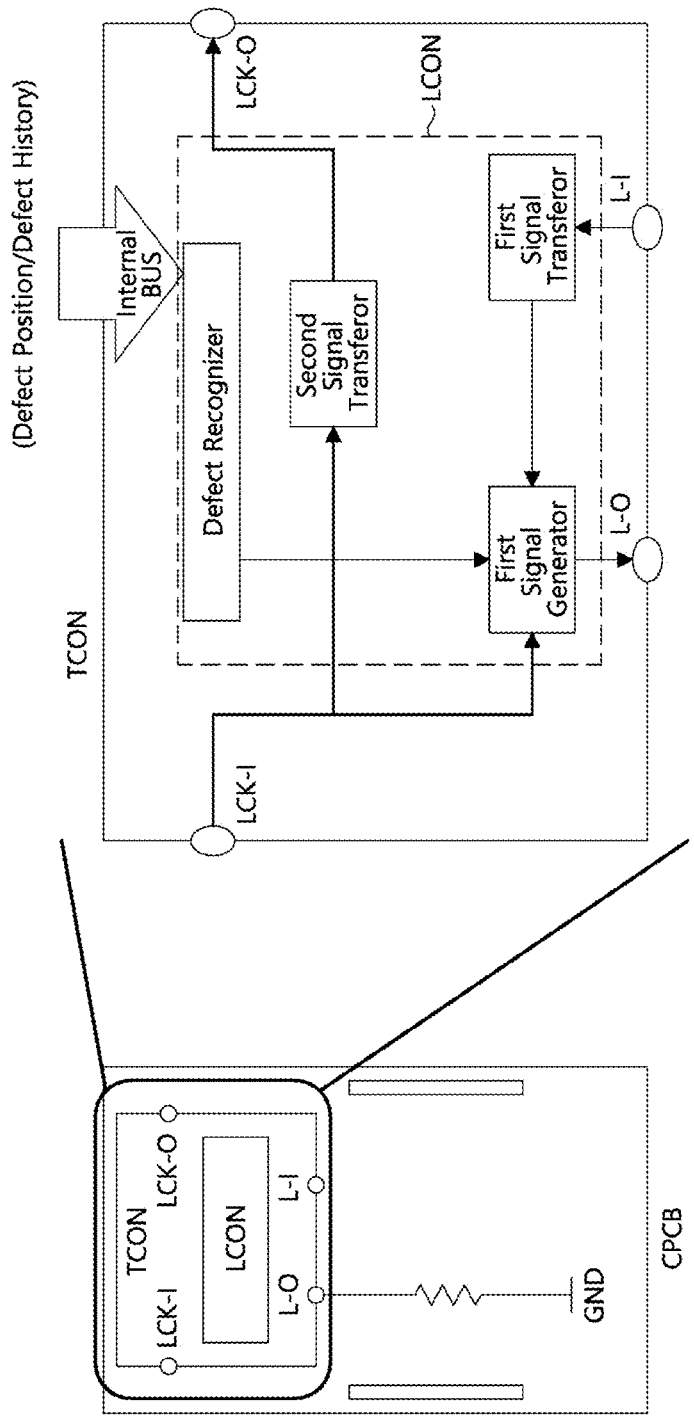
FIG. 16 is a diagram illustrating an overall configuration of each display module for implementing a breakdown diagnosis sequence in a tiling display apparatus according to an embodiment of the present disclosure.

FIG. 16 is a diagram illustrating an overall configuration of each display module for implementing a breakdown diagnosis sequence in a tiling display apparatus according to an embodiment of the present disclosure. The overall configuration of the display module described with reference to FIG. 16 can be used for each display module in a tilting display device according to the present embodiment that includes a set board, and a plurality of display modules connected to one another through a first interface circuit and a second interface circuit.

Referring to FIG. 16, each display module may include a timing controller TCON mounted on a control PCB CPCB. The timing controller TCON may include a diagnosis control circuit LCON for generating or transferring a defect occurrence and position signal and a defect history signal, a first input terminal L-I and a first output terminal L-O connected to a first interface circuit, and a second input terminal LCK-I and a second output terminal LCK-O connected to a second interface circuit.

The diagnosis control circuit LCON may include a defect recognizer, a first signal transferor, a first signal generator, and a second signal transferor.

The defect recognizer may check in real defect information (defect position/defect history) input through an internal bus circuit at a specific period, and when the defect information is checked, a control signal may be enabled.

The first signal transferor may check a defect occurrence and position signal received from an adjacent display module and may transfer a corresponding signal to the first signal generator.

When an enabled control signal is input from the defect recognizer, the first signal generator may generate a defect occurrence and position signal and may output the defect occurrence and position signal and, for example, transfer the same towards the set board SET, through the first interface circuit. When the enabled control signal is not input from the defect recognizer and a defect occurrence and position signal of an adjacent display module is input from the first signal transferor, the first signal generator may intactly output the input defect occurrence and position signal and, for example, transfer the same towards the set board SET, through the first interface circuit. Also, when a timing at which the enabled control signal is input from the defect recognizer overlaps a timing at which a defect occurrence and position signal of an adjacent display module is input from the first signal transferor, the first signal generator may preferentially perform an operation of generating the defect occurrence and position signal on the basis of the enabled control signal, thereby increasing the reliability of an operation.

The second signal transferor may transfer a defect recognition completion signal, received from an adjacent display module or the set board SET, to another display module. In a broken-down module, a function of the second signal transferor may be disabled. In addition, in a broken-down module in which an enabled control signal is input from the defect recognizer, if a defect recognition completion signal is input from the second interface circuit, the first signal generator may generate a defect history signal and may output the defect history signal and, for example, transfer the same towards the set board SET, through the first interface circuit.

According to an embodiment of the present disclosure, a defect position of a display module involving a defect may be automatically checked by a set board, and moreover, a defect history of a broken-down display module may be additionally and automatically checked. As a result, the tiling display apparatus according to an embodiment of the present disclosure may considerably shorten a time taken in detecting a position and a cause of a defect.

Moreover, according to an embodiment of the present disclosure, because a set board analyzes data transferred through SPI communication on the basis of a predetermined protocol to detect a position and a cause of a defect, an overall structure needed for diagnosing a breakdown may be simplified, and the manufacturing cost may be reduced.

The effects according to the present disclosure are not limited to the above examples, and other various effects may be included in the specification.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. A tiling display apparatus comprising:
 a plurality of display modules connected to one another through a first interface circuit and a second interface circuit, the plurality of display modules including a broken-down module having a timing controller configured to determine that the broken-down module is broken and output a defect occurrence and position signal responsive to the determination; and
 a set board receiving the defect occurrence and position signal output from the broken-down module through the first interface circuit in a first period, generating a defect recognition completion signal in a second period succeeding the first period that acknowledges a receipt of the defect occurrence and position signal responsive to receiving the defect occurrence and position signal, and transferring the defect recognition completion signal to the broken-down module through the second interface circuit in the second period,
 wherein each of the defect occurrence and position signal and the defect recognition completion signal is a pulse signal which swings between a high logic voltage and a low logic voltage, and
 wherein the set board further receives a defect history signal of the broken-down module from the broken-down module through the first interface circuit in a third period succeeding the second period.

2. The tiling display apparatus of claim 1, wherein the defect occurrence and position signal comprises a first falling edge and one or more first rising edges arranged next to the first falling edge, and the defect recognition completion signal comprises a second rising edge.

3. The tiling display apparatus of claim 2, wherein, in the first period, the set board recognizes occurrence of a defect of the broken-down module based on the first falling edge of the defect occurrence and position signal, counts the one or more first rising edges of the defect occurrence and position signal, and recognizes a position of the broken-down module based on a number of first rising edges, and in the second period, the broken-down module recognizes a defect recognition completion state of the set board based on the second rising edge of the defect recognition completion signal.

4. The tiling display apparatus of claim 2, wherein a number of first rising edges varies based on a connection position of the broken-down module of the plurality of display modules.

5. The tiling display apparatus of claim 2, wherein a number of first rising edges corresponds to a connection sequence, based on the second interface circuit, of the broken-down module of the plurality of display modules.

6. The tiling display apparatus of claim 1, wherein the defect history signal is a pulse signal that swings between the high logic voltage and the low logic voltage, and the defect history signal comprises one or more third rising edges.

7. The tiling display apparatus of claim 6, wherein the set board counts the one or more third rising edges of the defect history signal and recognizes, as a defect history of the broken-down module, one piece of defect candidate information of a breakdown diagnosis list based on a number of third rising edges.

8. The tiling display apparatus of claim 7, wherein the breakdown diagnosis list of the broken-down module comprises pieces of defect candidate information having different setting sequences, and the number of third rising edges corresponds to a setting sequence, of a piece of defect candidate information corresponding to a defect history of the broken-down module, among the pieces of the defect candidate information.

9. The tiling display apparatus of claim 1, wherein each of the first interface circuit and the second interface circuit is implemented with a serial peripheral interface.

10. The tiling display apparatus of claim 1, wherein the defect history signal is indicative of a type of historical defect that previously occurred in the broken-down module from a plurality of different types of historical defects.

11. A tiling display apparatus comprising:
a set board; and
a plurality of display modules connected to one another through a first interface circuit and a second interface circuit,
wherein at least one of the plurality of display modules comprises:
a timing controller configured to: determine that the display module is broken, generate a defect occurrence and position signal responsive to determining that the display module is broken, and output the defect occurrence and position signal to the set board through the first interface circuit in a first period, and receive, from the set board, a defect recognition completion signal that is generated by the set board and acknowledges a receipt of the defect occurrence and position signal by the set board responsive to receiving the defect occurrence and position signal through the second interface circuit in a second period succeeding the first period,
wherein each of the defect occurrence and position signal and the defect recognition completion signal is a pulse signal which swings between a high logic voltage and a low logic voltage, and
wherein the timing controller is further configured to generate a defect history signal of the display module and transfer the defect history signal to the set board through the first interface circuit in a third period succeeding the second period.

* * * * *